Jan. 7, 1964 W. F. HUCK 3,116,924
SHEET CONVEYING DEVICE
Filed Sept. 23, 1960 5 Sheets-Sheet 1

INVENTOR
WILLIAM F. HUCK
BY
ATTORNEY

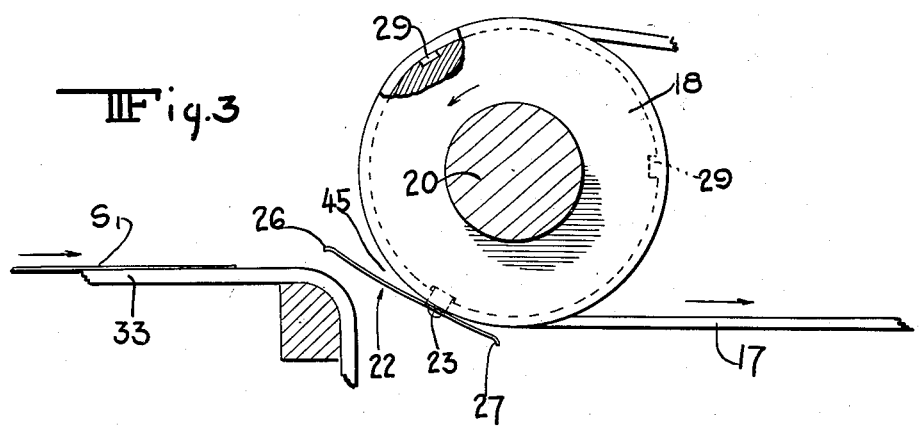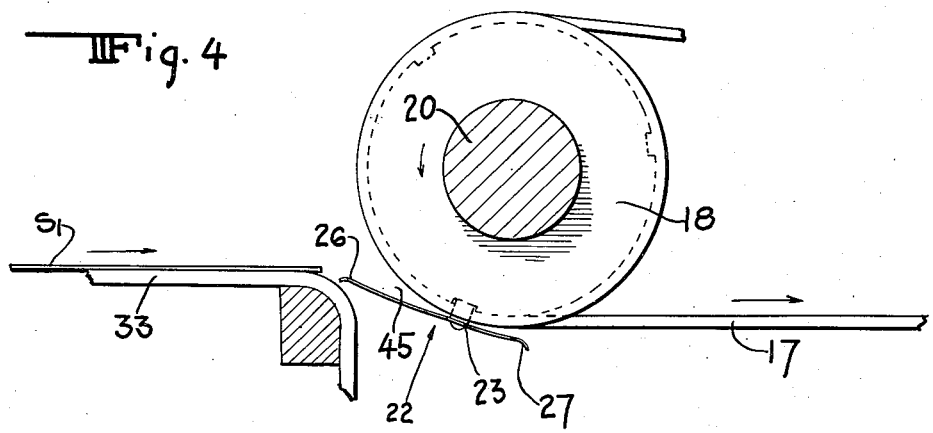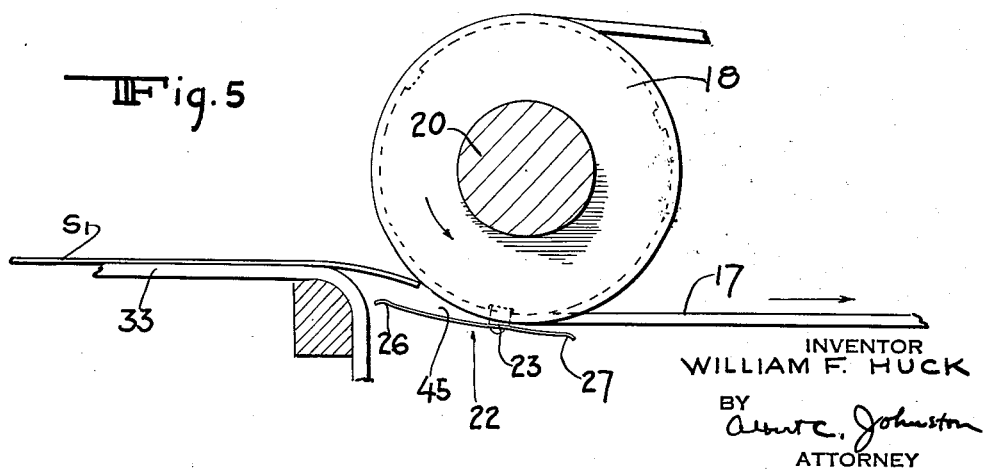

Jan. 7, 1964 W. F. HUCK 3,116,924
SHEET CONVEYING DEVICE
Filed Sept. 23, 1960 5 Sheets-Sheet 3
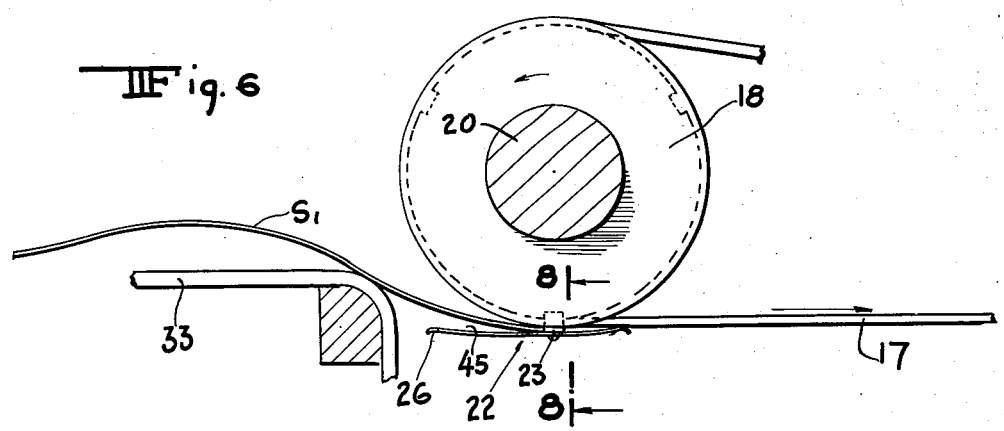
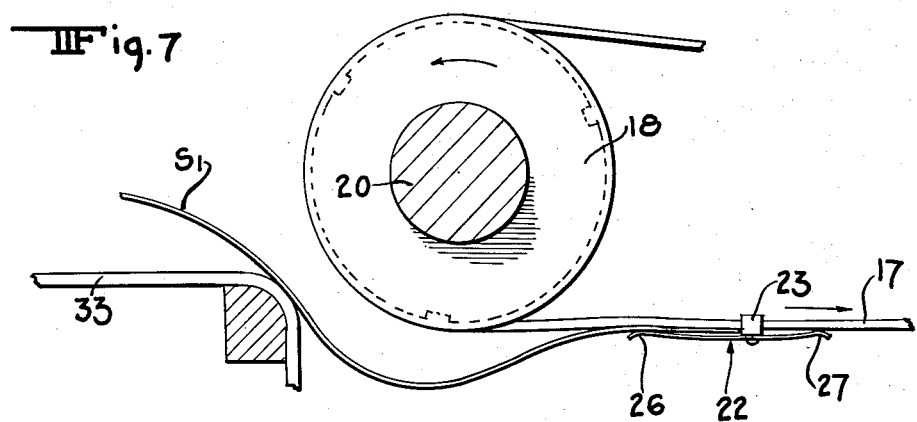
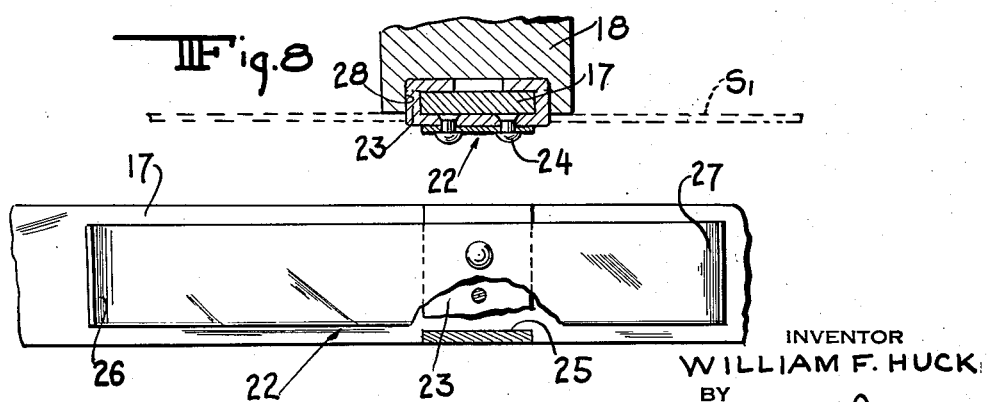
INVENTOR
WILLIAM F. HUCK
BY
ATTORNEY

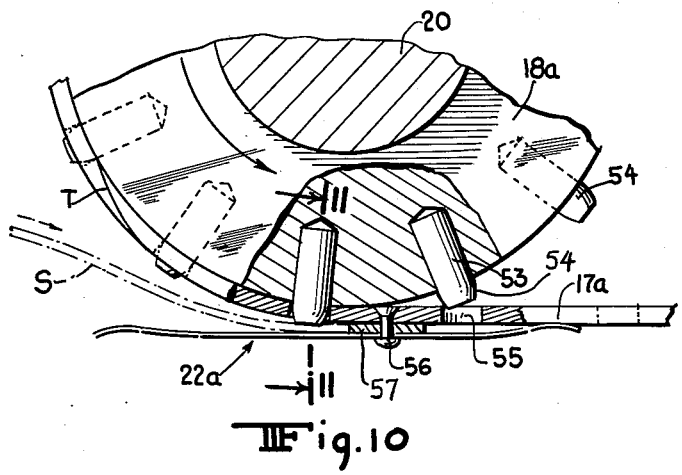
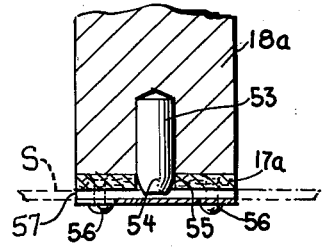
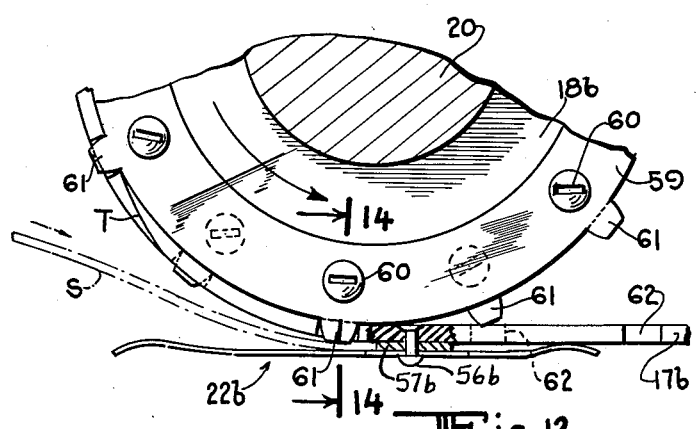
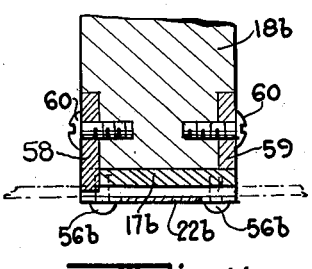
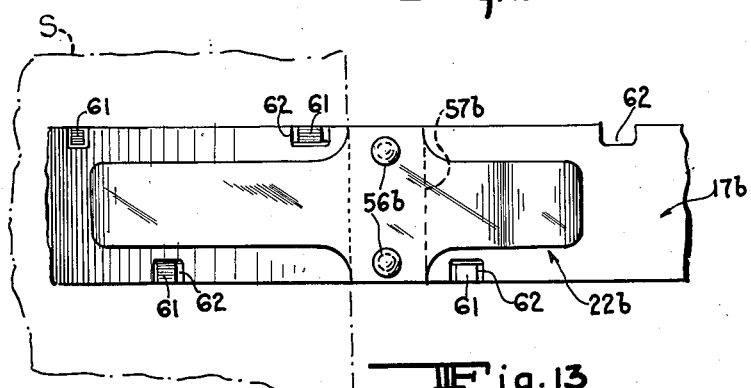

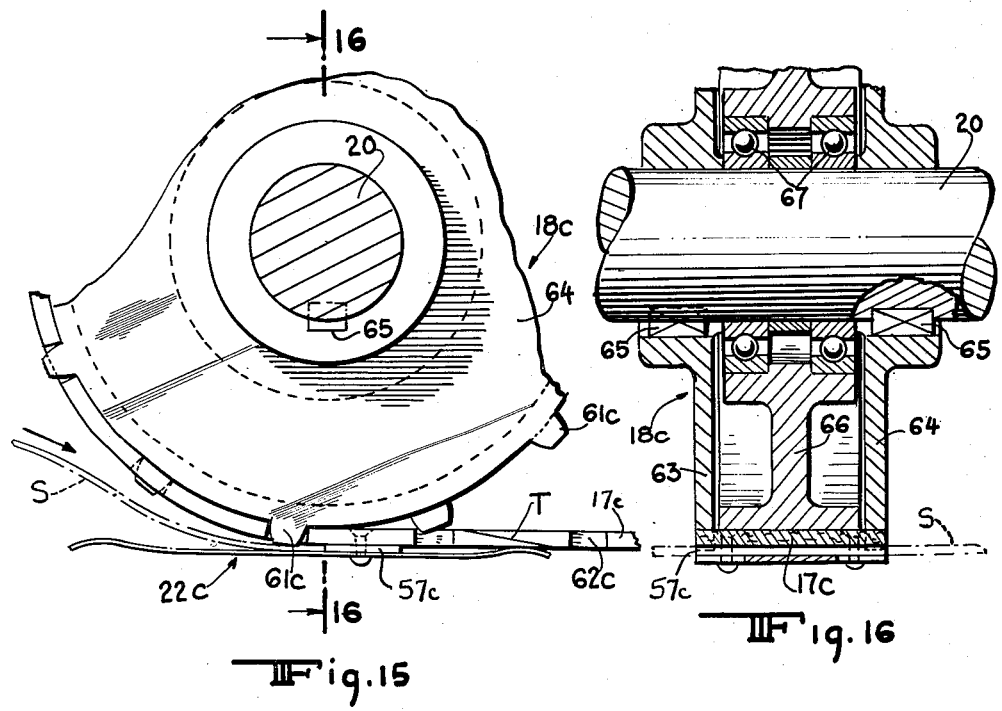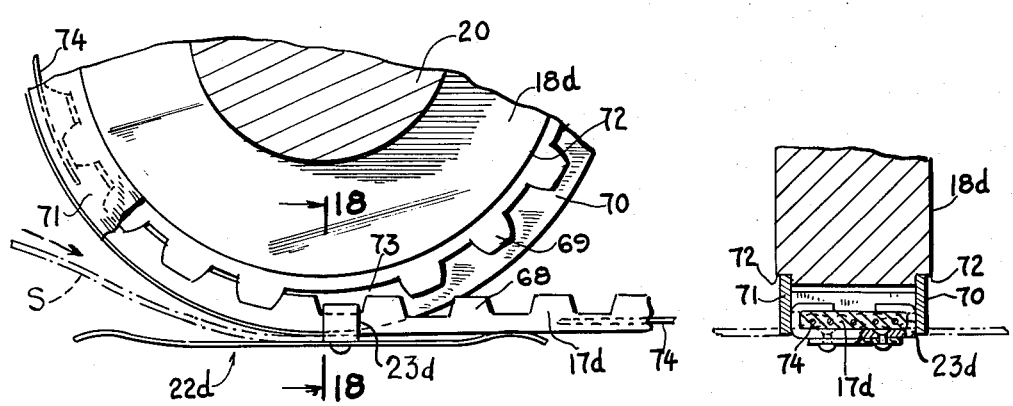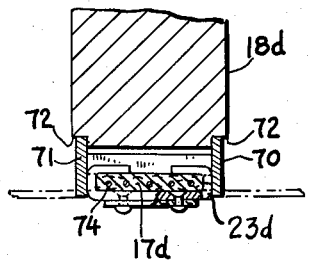

United States Patent Office 3,116,924
Patented Jan. 7, 1964

3,116,924
SHEET CONVEYING DEVICE
William F. Huck, 81 Greenway Terrace,
Forest Hills, N.Y.
Filed Sept. 23, 1960, Ser. No. 58,052
25 Claims. (Cl. 271—68)

This invention relates generally to conveying devices, and, more particularly, is directed to an improved conveying device for transporting articles, such as, for example, thin flexible sheets of paper, metal foil, plastics or the like, or signatures of collated and folded sheet or web material from one position to a more or less remote delivery position.

The need to transport thin flexible sheets of paper, metal, plastics or the like, occurs in many industries, such as in the printing industry, but the devotion of considerable time and expense to the development of devices for performing that function has failed to produce a dependable and economical solution, particularly when the application of the sheet conveying device requires the high speed operation thereof.

Existing sheet conveying devices usually include chains, belts or the like movable along a path extending from the take-up or sheet receiving position to the delivery position and having gripping elements hingedly mounted thereon which are actuated by suitable mechanisms so that the gripping elements are open at the receiving and delivery positions and are closed during movement therebetween. However, sheet conveying devices having such pivotally mounted gripping elements do not operate reliably, particularly at high speeds, because of the inherent difficulty involved in rapidly and cyclically moving the relatively large weights represented by the gripping elements and the supporting and actuating mechanisms therefor. These difficulties are particularly apparent when the chains or belts of the conveying device travel at high speed along paths having sharp changes of direction, for example, when such paths have arcuate and straight portions respectively defined by the sprockets or pulleys around which the chains or belts run and by the runs or stretches of the chains or belts between the sprockets or pulleys. The described existing sheet conveying devices are further disadvantageously characterized by the relatively high initial and maintenance costs resulting primarily from the complex construction thereof which requires numerous cams, followers, levers, abutments, bearings and other similar mechanical elements, for the purpose of opening and closing the pivoted gripping elements at the desired locations along the path of travel.

Another disadvantage of the complex construction of the existing sheet conveying devices is the large weight of the gripping components which results in large and undesirable deflection of the conveyor from the horizontal due to the gravitational attraction for these relatively heavy components. Because of this, existing sheet conveying devices can only be used to transport the sheets along relatively limited distances. A further disadvantage of these existing sheet conveying devices has been the difficulty encountered in maintaining the timed relationship between successive sheets as they enter, are transported by, and are delivered by the conveying device.

Accordingly, it is an object of this invention to provide an article conveying device, particularly for transporting thin flexible sheets from a receiving or take-up position to a delivery position, which device is of relatively simple and inexpensive construction, and is capable of reliable high speed operation.

Another object is to provide a sheet conveying device having a minimum number of moving parts susceptible to severe wear, thereby to minimize the maintenance and repair costs involved in the continuous high speed operation of the device.

Still another object is to provide a sheet conveying device which can have runs of relatively large lengths without excessive deflection from a horizontal path.

A further object is to provide sheet conveying devices which are capable of maintaining positive control over the sheets being conveyed so that the latter are delivered to their destination in fully timed sequential relationship with respect to additional equipment capable of performing further operations on these sheets, such as stacking, counting, and the like.

In accordance with an aspect of this invention, a sheet conveying device comprises a flexible carrier movable along a path that includes portions of relatively large curvature and relatively small curvature, respectively, that is, portions of the path respectively having small and large radii of curvature, and at least one elongated gripping element extending generally in the direction of movement of the carrier and being secured to a part of the latter of more limited extent in the direction of movement than the gripping element, with the gripping element having at least one free end portion spaced longitudinally from that part of the carrier so that, while the gripping element is fixed relative to the attached part of the carrier and has its free end portion disposed relatively close to the adjacent portion of the carrier during movement of the gripping element with the carrier along the relatively small curvature portion of the path of travel, thereby to grip a sheet or other article to be conveyed between the carrier and the free end portion of the gripping element, the free end portion of the gripping element is spaced away from the adjacent portion of the carrier during the movement of the gripping element with the carrier along the relatively large curvature portion of the path of travel, thereby to permit a sheet or other article to be inserted or removed from between the gripping element and the carrier.

In a sheet conveying device embodying the invention and having the above characteristics, it is only necessary to provide the path of travel of the flexible carrier with relatively large curvature portions at the sheet take-up or receiving position and at the sheet delivery position, respectively, while the portion of the path of the flexible carrier between those two positions is given a relatively small curvature, whereby the sheet gripping and releasing functions of the gripping element or elements can be performed without providing any mechanism for effecting movement of the gripping element or elements with respect to the part of the flexible carrier supporting the same. Thus, a relatively simple arrangement having few movable parts can be employed to achieve a result previously accomplished only by relatively complex mechanisms which proved relatively unreliable in high speed operation.

In a preferred embodiment of the invention, the flexible carrier is in the form of one or more belts guided along a path having arcuate portions and a relatively straight, unsupported portion therebetween, and each elongated gripping element is secured, intermediate its ends, to a related belt and is shaped so that, during movement along the relatively straight, unsupported portion of the path, both ends of the gripping element bear against the belt in order to ensure the firm gripping of the sheet held between one end of the gripping element and the belt even though the latter is capable of flexing during movement along that relatively straight, unsupported portion of its path.

In accordance with another aspect of the invention, the successive sheets to be conveyed are fed to the take-up or sheet receiving positions of the gripping elements, where each gripping element is in its open condition, at a speed exceeding the speed of travel of the belt, thereby to ensure that the leading edge of the sheet received between the open gripping element and the belt will remain therebetween until the gripping element moving with the belt has reached a portion of the path of travel at which the free end of the gripping element bears against the belt to securely hold the leading edge of the sheet therebetween, thus making sure that each of the successive sheets is reliably taken-up by the gripping element or elements even during high speed operation of the sheet conveying device.

The above, and other objects, features and advantages of the invention, will be apparent in the following detailed description of an illustrative embodiment thereof which is to be read in connection with the accompanying drawings forming a part hereof, and wherein:

FIGS. 3, 4, 5, 6 and 7 are enlarged views of a portion of the structure shown in FIG. 1 and illustrating the successive phases of an operating sequence by which a sheet is taken-up by the gripping elements of the device embodying the invention;

FIG. 8 is an enlarged transverse sectional view taken along the line 8—8 of FIG. 6;

FIG. 9 is an enlarged plan view, partly broken away and in section, illustrating the attachment of each gripping element to the related belt in the sheet conveying device illustrated in FIGS. 1 to 8;

FIG. 10 is an enlarged fragmentary side elevational view, partly broken away and in section, showing the construction of a pulley and belt in a sheet conveying device in accordance with another embodiment of the invention;

FIG. 11 is a sectional view taken along the line 11—11 of FIG. 10;

FIG. 12 is a view similar to that of FIG. 10, but illustrating another embodiment of the invention;

FIG. 13 is a bottom plan view of the structure shown in FIG. 12;

FIG. 14 is a sectional view taken along the line 14—14 of FIG. 12;

FIG. 15 is another view similar to that of FIG. 10, but illustrating still another embodiment of the invention;

FIG. 16 is a sectional view taken along the line 16—16 of FIG. 15;

FIG. 17 is still another view similar to that of FIG. 10, but illustrating a further embodiment of the invention; and FIG. 18 is a sectional view taken along the line 18—18 of FIG. 17.

Figure 1:
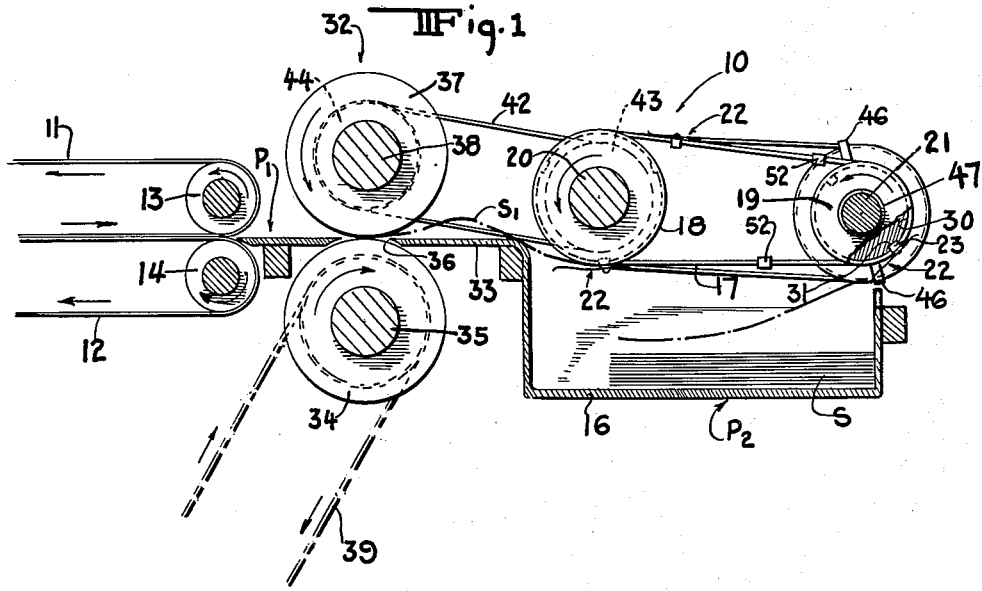
FIG. 1 is a vertical sectional view of a sheet conveying device embodying the present invention and taken along the line 1—1 of FIG. 2.
Figure 2:
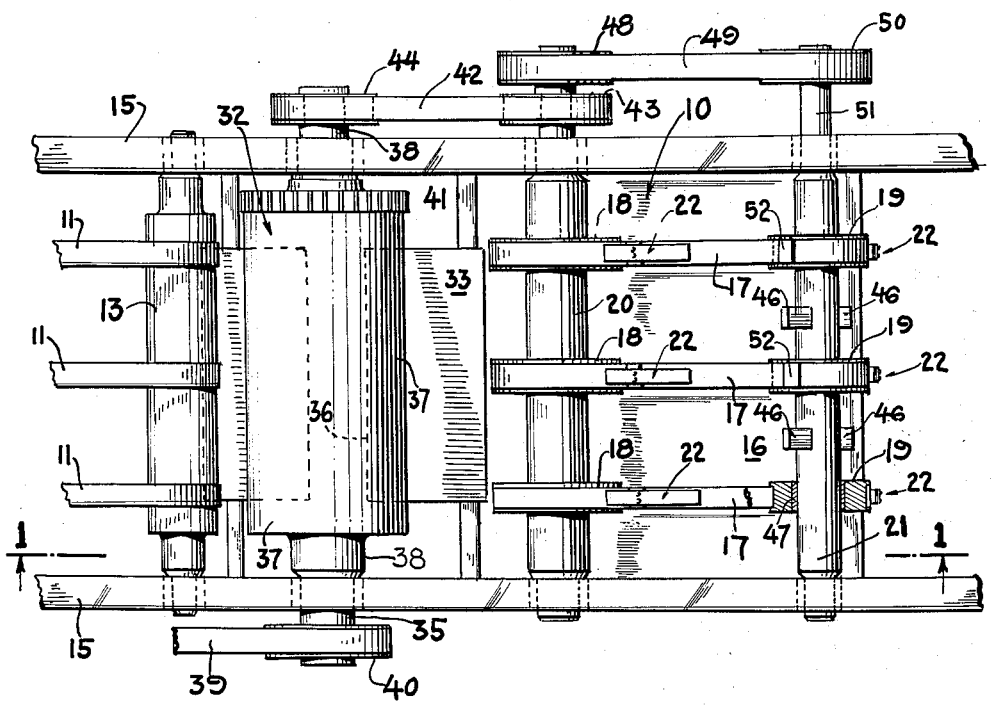
FIG. 2 is a top plan view of the sheet conveying device of FIG. 1.

Referring to the drawings in detail, and initially to FIGS. 1 and 2 thereof, it will be seen that the sheet conveying device embodying the present invention, and there generally identified by the reference numeral 10, is employed for transporting successive sheets of paper, metal foil, plastics or the like from a first position $P_1$ to a second position $P_2$. The position $P_1$ is located at the delivery ends of cooperating conveyor belts 11 and 12 running around rollers 13 and 14 which are suitably journalled in bearings carried by side frame members 15. Belts 11 and 12 are operative to deliver the sheets in succession to the position $P_1$, for example, from a printing press or the like. The position $P_2$ is represented by a magazine 16 which is suspended between side frame members 15 and adapted to receive the successive flexible sheets in a stack, as indicated at S.

The sheet conveying device 10 generally includes a flexible carrier in the form of parallel belts 17 running around pulleys 18 and 19 which are carried by parallel, spaced apart shafts 20 and 21, respectively, having their ends journalled in bearings carried by side frame members 15 so that the flexible carrier formed by belts 17 is guided for movement along a path having portions of relatively large curvature, that is, portions with small radii of curvature, represented by the arcuate surfaces of pulleys 18 and 19 engaged by each belt, and portions of relatively small curvature, that is, portions with large radii of curvature, represented by the substantially straight, unsupported runs of belts 17 between pulleys 18 and 19.

At least one elongated gripping element 22 is secured to the outside surface of each belt 17, that is, the surface of the latter which is at the outside of the path of travel of the belt during movement along the relatively large curvature portions of the path of travel of the flexible carrier. The gripping elements 22 extend generally in the direction of movement of the related belts and are located along the latter so as to be transversely aligned with each other, as is apparent in FIG. 2. When each belt 17 carries more than one gripping element 22, for example, as in the illustrated embodiments of the invention, in which each belt 17 carries three gripping elements, such gripping elements are equally spaced apart along the belt.

Each gripping element 22 is fixedly attached, intermediate its opposite ends, to a part of the related belt 17 having a smaller extent or dimension in the direction of movement of the belt than the gripping element 22. For example, as shown in FIGS. 8 and 9, each gripping element 22 may be attached to the related belt 17 by means of a substantially C-shaped clamp 23 secured to gripping element 22, as by rivets 24 and embracing belt 17. The opposite longitudinal edges of each belt 17 are preferably formed with rectangular cutouts or recesses 25 (FIG. 9) receiving the clamp 23 so that the outer side surfaces of clamp 23 can be flush with the longitudinal edges of belt 17 while the engagement of clamp 23 in recesses 25 positively locates each gripping element along the related belt 17 and prevents displacement of the gripping element from the desired location along the belt. Since each gripping element 22 is secured only intermediate its ends to the related belt 17 by means of clamp 23, each elongated gripping element includes finger-like portions 26 and 27 projecting in opposite directions from the related clamp 23 and being free, at their ends, from belt 17. As shown particularly in FIG. 9, finger-like portions 26, which trails the related clamp 23 with respect to the direction of movement of belt 17, is preferably longer than the leading finger-like portion 27. Further, as shown particularly in FIG. 7, the finger-like portions 26 and 27 of each gripping element 22 are formed so that the free ends thereof bear strongly against the related belt 17 to define the closed condition of the gripping element 22 during movement of the latter with the belt 17 along the relatively small curvature portion of the path of travel, that is, when the gripping element is positioned along the substantially straight, unsupported run of the related belt between pulleys 18 and 19.

In the illustrated embodiment of the invention, finger-like portions 26 and 27 of each gripping element extend substantially tangentially with respect to the part of the related belt 17 to which the gripping element is fixedly attached by clamp 23, and the free ends of portions 26 and 27 are preferably slightly bowed inwardly toward the belt in order to provide the requisite bearing against the latter during movement along the substantially straight, unsupported run of the belt. However, it is to be understood that the gripping element 22 may have a configuration different from that illustrated in the drawings and described above so long as the free ends of the finger-like portions 26 and 27 are brought into simultaneous bearing engagement with the related belt 17 during movement along the relatively straight, unsupported run of the latter.

By reason of the fact that each gripping element 22 is secured to a part of the related belt 17 having a limited extent or dimension in the direction of movement, and which is spaced longitudinally from the free end of its finger-like portion 26, such free end of finger-like portion 26 will be in an opened condition, that is substantially spaced from the adjacent portion of related belt 17, during movement of the gripping element with the belt along the relatively large curvature portion of the path of travel of the latter, as defined by the pulleys 18 and 19 (FIGS. 3, 4, 5 and 6). Thus, even though each gripping element is fixedly attached to the related flexible belt, finger-like portion 26 of each gripping element assumes an open condition at which it is spaced substantially from the belt, or a closed condition, at which the free end of finger-like portion 26 bears strongly against the belt, depending upon the portion of the path of travel of the belt being traversed by the gripping element. It is apparent that, when finger-like portion 26 of the gripping element is in its open condition, the edge of a flexible sheet can be either inserted in the space 45 between belt 17 and finger-like portion 26 or released from the space 45, whereas, when finger-like portion 26 is in its closed condition, as in FIG. 7, it is adapted to tightly hold or grip the edge portion of a flexible sheet against the adjacent portion of the related belt 17.

Although belts 17 of the illustrated embodiment of the invention are unsupported during movement along the relatively small curvature portions of their path of travel, that is, along the substantially straight runs between the pulleys 18 and 19, and therefore each belt is free to flex away from the finger-like portion 26 of each gripping element 22 in the closed condition of the latter, finger-like portion 27 of each gripping element extending in the opposite direction from the related finger-like portion 26 and simultaneously bearing against belt 17 tends to maintain finger-like portion 26 tightly against belt 17 for ensuring the maintenance of an adequate gripping action on the sheet being transported.

As shown in FIGS. 3 and 8, each of the pulleys 18 preferably has a peripheral groove 28 receiving the related belt 17, and such groove has spaced apart recesses 29 (FIG. 3) formed in the bottom thereof and circumferentially located to receive clamps 23 securing gripping elements 22 to belt 17, whereby each belt 17 can run smoothly around the related pulley 18 and the engagement of clamps 23 in recesses 29 serves to maintain a predetermined positional relationship between belts 17 and the related pulleys 18. Similarly, as shown in FIG. 1, each of pulleys 19 also has a peripheral groove 30 receiving the related belt 17 and formed with one or more recesses 31 in the bottom thereof to receive the clamps 23 by which gripping elements 22 are secured to the belt.

In the sheet conveying device 10, the leading edge portion of a flexible sheet $S_1$ is inserted into space 45 between finger-like portion 26 of each gripping element 22 and the adjacent portion of the related belt 17 as the gripping element is in its open condition during travel along the relatively large curvature portion of the path of travel of the related belt defined by the pulley 18, and is gripped between belt 17 and finger-like portion 26 when the gripping element is in its closed condition during travel of gripping element 22 along the relatively small curvature portion of its path of travel defined by the lower substantially straight run of the belt 17 extending from pulley 18 to pulley 19. Thus, the leading edge of sheet $S_1$ is correspondingly transported along the lower straight belt run until gripping element 22 travels along the relatively large curvature portion of the path of travel of belt 17 defined by the related pulley 19 where finger-like portion 26 is again in its open condition, that is, spaced from the belt to release the leading edge portion of sheet $S_1$ and thereby permit the latter to fall onto the top of stack S in underlying magazine 16.

Since finger-like portion 26 of each gripping element 22 changes only gradually from its open condition to its closed condition as the gripping element moves from the relatively large curvature portion of the path to the relatively small curvature portion of the path, the sheet conveying device 10 embodying this invention further preferably includes a sheet feeding mechanism 32 (FIGS. 1 and 2) which acts on each sheet $S_1$ delivered by conveyor belts 11 and 12 to the position $P_1$ and advances the sheet toward the take-up or receiving position of gripping elements 22 in a manner to ensure that the leading edge of each sheet is maintained between gripping elements 22 and the related belts 17 during the gradual change of the gripping elements from the open condition to the closed condition thereof.

In sheet conveying device 10, the successive sheets delivered by conveyor belts 11 and 12 are discharged onto a substantially horizontal surface or table 33 which is disposed at the level of the take-up or sheet receiving position of gripping elements 22, that is, slightly above the bottom portions of pulleys 18. Table 33 extends from pulleys 13 and 14 carrying belts 11 and 12 to a location adjacent pulleys 18 carrying belts 17.

Sheet feeding mechanism 32 of the illustrated embodiment of the invention includes a lower sheet feeding roll 34 disposed below the table 33 and having axially aligned stub shafts 35 at its opposite ends extending rotatably through suitable bearings carried by side frame members 15. The surface of roll 34 projects, at the top of the latter, through a suitable opening 36 formed in table 33 for frictional contact with the bottom surfaces of the successive sheets advanced over table 33 from the delivery ends of conveyor belts 11 and 12. Sheet feeding mechanism 32 further includes an upper sheet feeding roll 37 disposed above opening 36 of table 33 and having axially aligned stub shafts 38 extending from its opposite ends and rotatably received in suitable bearings carried by side frame members 15. Roll 37 is vertically disposed for frictional engagement, at the bottom thereof, with the upper surfaces of the successive sheets simultaneously with the frictional engagement of the latter by lower roll 34.

Rolls 34 and 37 are counter-rotated, for example, in the clockwise and counterclockwise directions, respectively, as viewed in FIG. 1, at rotational speeds that are sufficient to advance each flexible sheet toward the take-up or receiving positions of gripping elements 22 at a linear speed exceeding the speed of movement of the gripping elements with the related belts 17. As shown in FIGS. 1 and 2, roll 34 may be conveniently driven from a motor (not shown), or from the drive shaft of an associated machine, for example, a printing press delivering the successive sheets to the conveyor belts 11 and 12, by means of a drive belt 39 running around a pulley 40 secured on an extension of one of the stub shafts 35 of roll 34, while roll 37 is, in turn, driven from roll 34 at the same peripheral speed as the latter, but in the opposite direction, by means of meshing gears 41 rotatably coupled to rolls 34 and 37, at one end thereof.

The desired relationship between the peripheral speeds of rolls 34 and 37 and of gripping elements 22 may be maintained by driving shaft 20, to which pulleys 18 are secured, from feeding mechanism 32, for example, by means of a drive belt 42 running around a pulley 43 secured to an end of shaft 20 and around a pulley 44 secured to an extension of one of the stub shafts 38 of roll 37. If pulleys 43 and 44 have substantially the same diameter, as in the drive arrangement illustrated in FIGS. 1 and 2, roll 37 can be given a greater peripheral speed than gripping elements 22 by forming roll 37 with a diameter larger than the diameters of pulleys 18.

The sheet conveying device 10 embodying this invention is operated synchronously with the feeding of the successive sheets to the position $P_1$ by conveyor belts 11 and 12, and the operating sequence of the device in taking-up each of the successive sheets delivered to the position $P_1$, and in transporting the sheets to the position $P_2$ is hereinafter described in detail with reference to FIGS. 3 to 7, inclusive.

As a transversely aligned group of gripping elements 22 move along the relatively large curvature portion of the path of travel of belts 17 defined by pulleys 18, with fingerlike portion 26 of each gripping element being in its opened condition, that is, spaced from the related belt 17 to define the space 45 therebetween, a sheet $S_1$ is being simultaneously advanced by feeding mechanism 32 toward the end of table 33 adjacent pulleys 18, as shown in FIG. 3. When the free ends of finger-like portions 26 descend to the level of table 33, that is, to the take-up or sheet receiving position, the leading edge of sheet $S_1$ reaches the end of table 33, as shown in FIG. 4. During further movement of gripping elements 22 along the section of the relatively large curvature portion of the path adjacent the successive relatively small curvature portion of the path, the substantially higher linear speed imparted to the sheet $S_1$ by feeding mechanism 32 causes the leading edge of the sheet to be projected into the space 45 between finger-like portion 26 of each gripping element and the related belt 17, as in FIG. 5.

As the clamp 23 by which each gripping element 22 is fixedly attached to the related belt 17 reaches the end of the relatively large curvature portion of its path of travel at the bottom of related pulley 18, so that further movement of the gripping element is accompanied by the smooth and gradual change thereof from its open condition to its closed condition, the continued relatively high speed advancement of the sheet $S_1$ by feeding mechanism 32 brings the leading edge of the sheet into abutting relationship with the side of clamp 23 facing toward space 45, as shown in FIG. 6. The rolls 34 and 37 of feeding mechanism 32 are located with their line of contact at a distance from the bottom of pulleys 18 which is smaller than the length of each sheet to be conveyed so that rolls 34 and 37 continue to engage the sheet for advancing the latter at a relatively high speed until each gripping element 22 has attained its closed condition, as in FIG. 7, and is thus adapted to securely grip the leading edge portion of the machine against the related belt 17.

Since feeding mechanism 32 continues to act on the flexible sheet after the leading edge of the latter has abutted against the clamps 23 securing gripping elements 22 to the related belts, it will be apparent that the final engagement of feeding rolls 34 and 37 with the sheet normally causes a controlled buckling of the latter, as illustrated in FIG. 6, for ensuring the maintenance of the leading edge portion of the sheet within space 45 of each open gripping element until the latter has changed to its closed condition. The previously mentioned buckling of each sheet advanced by feeding mechanism 32 into gripping engagement by the elements 22 ensures that such gripping engagement will be reliably attained even during high speed operation, at which time there is the possibility of a slight inaccuracy in the synchronization of the movement of the gripping elements 22 and the delivery of the successive sheets by the conveyor belts 11 and 12.

Although the illustrated sheet conveying device 10 embodies an arrangement in which gripping elements 22 transport the successive sheets during movement along the lower straight runs of belts 17, it is to be understood that the direction of movement of the belts could be reversed, and the successive sheets could be fed into gripping engagement with elements 22 as the latter move from the arcuate path of travel defined by the pulleys 18 onto the upper straight run of belts 17, for transport of the successive sheets along the upper runs of the belts. Further, although the finger-like portions 26 of gripping elements 22 employed for gripping engagement with the successive sheets are illustrated as being in trailing positions with respect to clamps 23 securing the gripping elements to the related belts 17, it is to be understood that such finger-like portions 26 could extend forwardly from the related clamps 23, that is, in the direction of movement of the belts 17 and similarly act to grip and release sheets or other articles during movement along the differently shaped portions of the path of travel.

In order to ensure the removal of the leading edge of each flexible sheet from between the gripping elements 22 and the related belts 17 when the finger-like portions 26 of the gripping elements are in open condition in response to their movement around the pulleys 19, particularly during high speed operation of the sheet conveying device 10, the latter preferably further includes speed reducing blades 46 (FIGS. 1 and 2) projecting radially from shaft 21 at axial locations between the pulleys 19 and having their outer ends projecting beyond the peripheries of pulleys 19. The shaft 21 is rotatable with respect to the pulleys 19 by mounting the latter on bearings 47 carried by the shaft. Thus, the pulleys 19 are rotated by frictional engagement with the belts 17 which are driven from the pulleys 18 on rotated shaft 20. The shaft 21 is rotated at a smaller rotational speed than the pulleys 19, for example, by a belt and pulley transmission that includes a pulley 48 fixed to an end extension of shaft 20 and having the same diameter as the pulleys 18, and a belt 49 running around the pulley 48 and also around a pulley 50 that is fixed to an end extension 51 of shaft 21 and has a larger diameter than the pulleys 19.

Since shaft 21 rotates at a lower rotational speed than the pulleys 19 driven by belts 17, the belts 17 carrying gripping elements 22 will have a higher linear speed of travel than the speed reducing blades 46 at radial distances from the axis of shaft 21 equal to the radii of pulleys 19. Further, speed reducing blades 46 are arranged on shaft 21 so that, as a group of gripping elements 22 begin to travel around pulleys 19, as in FIG. 1, and thus have their finger-like portions 26 disposed in open condition to release the leading edge of a sheet, speed reducing blades 46 simultaneously engage the leading edge of the released sheet and, since the speed reducing blades thus engaged with the leading edge of a sheet have a smaller linear speed of travel than the gripping elements 22, the speed reducing blades 46 act to retard the released sheet relative to the gripping elements and thereby ensure the removal of the released leading edge of the sheet from between the gripping elements and the related belts 17. Further, in effecting the deceleration of the released sheet, the speed reducing blades 46 tend to reduce the impact of the released sheet against the end wall of the stacking magazine 16.

It should be understood that, although magazine 16 is shown as being fixed in position, that sheet collecting apparatus could be replaced by movable belts, vertically movable magazines or other collecting devices well known to those skilled in the sheet handling art.

C-shaped clamps 52 similar to the clamps 23 securing the gripping elements 22 to belts 17, and which have been described in detail with reference to FIGS. 8 and 9, may be provided on each belt 17 at locations intermediate the clamps 23, as shown in FIGS. 1 and 2, and also are receivable in recesses 29 and 31 formed in pulleys 18 and 19 for the purpose of maintaining the correct timed relationship between the movements of the belts 17 on pulleys 18 and 19 and the advancement of the successive sheets to the conveying device 10 by the sheet feeding mechanism 32.

Although the belts 17 carrying gripping elements 22 are flat, as shown in FIG. 8, and the cooperative engagement of the clamps 23 and 52 with the recesses 29 and 31 of pulleys 18 and 19 is relied upon for the maintenance of the desired timed relationship between the movements of the gripping elements and the feeding of sheets to the sheet conveying device 10 in the previously described embodiment of this invention, it is to be noted that a number of other arrangements may be provided for maintaining this desired timed relationship. Thus, as shown in FIGS. 10 and 11, each of the pulleys fixed on shaft 20, and there identified by the reference numeral 18a, may have a series of radially directed, equally spaced apart pins 53 which are frictionally held in suitable radially opening bores formed in the pulley, with the outer end portion 54 of each pin 53 projecting beyond the peripheral surface of the pulley 18a by a distance slightly larger than the thickness of the related conveyor belt 17a and having an involute shape for tangential entrance and withdrawal of the outer portions 54 of the pins 53 into and from suitably spaced apart holes 55 that are punched in belt 17a along the longitudinal center line of the latter. The pins 53 successively engaging in holes 55 of belt 17a laterally guide the latter with respect to pulley 18a and further prevent any rotational slippage of the pulley relative to the belt, thereby to maintain the desired timed relationship between the rotation of shaft 20 and the movement of the gripping elements 22a mounted on the belt.

In the embodiment of FIGS. 10 and 11, each gripping element 22a is in the form of a generally flat blade of resilient material similar to the previously described gripping element 22, but is secured, intermediate its ends, to the belt 17a by means of rivets 56 which pass through the belt, the gripping element and an interposed spacer 57 providing the desired space between the gripping element and the belt for receiving the leading edge of a sheet S therebetween.

When the pulleys 18a on shaft 20 and the belts 17a have the construction described above with reference to FIGS. 10 and 11, the pulleys on the shaft 21 at the opposite end of the conveyor path may be similar to the pulleys 18a, that is, may have projecting pins for reception in the holes 55 of the belts, or may be merely grooved pulleys similar to the pulleys 19 of FIGS. 1 and 2.

Another arrangement for achieving the desired timed relationship between the movement of the gripping elements and the rotation of shaft 20 is illustrated in FIGS. 12, 13 and 14, wherein each pulley 18b secured on shaft 20 has flat annular rings 58 and 59 attached, as by screws 60, to the opposite sides of the peripheral portion of the pulley. The rings 58 and 59 have spaced apart teeth 61 projecting radially from their outer periphery to engage in cutouts 62 formed in belt 17b at spaced apart locations along the opposite side edges of the belt. As shown in FIG. 13, the cutouts 62 at the opposite side edges of the belt 17b are in a staggered arrangement, so as to avoid substantial reduction of the tensile strength of the belt. The teeth 61 of rings 58 and 59 also have an involute shape to ensure purely tangential engagement and disengagement of teeth 61 with cutouts 62.

The gripping elements 22b carried by each belt 17b are the same as the previously described gripping elements 22a and are similarly attached to the related belt by means of rivets 56b with a spacer 57b being interposed between the gripping element and the belt. Here again, the pulleys on shaft 21 may have the same configuration as the described pulleys 18b, or may be simple grooved pulleys 19, as in the first described embodiment of the invention.

In a modification of the arrangement illustrated in FIGS. 12, 13 and 14, each of the rings 58 and 59 carrying a circumferentially spaced apart series of radially directed teeth 61 may be replaced by a series of individual tooth elements which are separately secured to the opposite sides of the peripheral portion of the pulley at locations corresponding to the illustrated locations of the teeth 61.

Where the runs of the conveyor belts between the pulleys on shafts 20 and 21 extend over relatively long distances, and it is therefore necessary to subject the conveyor belts to relatively high tensions so as to minimize their deflections from a horizontal path, it may be difficult to align the teeth 61 of each pulley 18b with the cutouts 62 of the related belt when placing the latter around the pulleys on shafts 20 and 21. An arrangement for avoiding this difficulty is illustrated in FIGS. 15 and 16, wherein each pulley 18c on shaft 20 is shown to include a pair of axially spaced apart discs 63 and 64 having hubs rotatably connected to shaft 20, as by keys 65, and being formed with involute-shaped teeth 61c projecting radially outward from their peripheries at spaced apart locations. Each pulley 18c further includes a flanged wheel 66 located axially between the discs 63 and 64 and being rotatably mounted on shaft 20 by means of anti-friction bearings 67 so that the flanged wheel 66, which supports the belt 17c during movement of the latter around the pulley 18c, is free to turn relative to shaft 20, and hence relative to discs 63 and 64 having the teeth 61c that are engageable in the cutouts 62c formed, at staggered locations, along the opposite side edges of belt 17c.

With the construction of pulley 18c described above, the belt 17c is free to adjust itself circumferentially about the pulley in order to accurately align its cutouts 62c with the teeth 61c, and therefore appreciably reduces damaging wear of the belt. The belt 17c is substantially the same as the previoushly described belt 17b, and the related gripping elements 22c are the same as the gripping elements 22b and are secured to the belt 17c in the same way. Further, the pulleys 18c and belt 17c may be used in connection with similar pulleys on the other shaft 21, or in connection with the simple grooved pulleys 19 of FIGS. 1 and 2.

In the embodiments of the present invention described above with reference to FIGS. 10 to 16, inclusive, the various belts are formed from flat belt material of leather, nylon or other plastics which may be purchased as a commercially available item and which is diagonally cut to the desired length, whereupon the diagonally cut ends are bonded together, as at T (FIGS. 10, 12 and 15), to form a continuous belt of any desired length into which the required holes 55 or cutouts 62 or 62c may be punched without appreciably reducing the belt strength.

Although the belts of the previously described embodiments of the invention are formed of flat belting, it is to be noted that a sheet conveying device embodying the present invention may employ grooved timing belts 17d which run around grooved timing belt pulleys on the shafts 20 and 21, for example, as indicated at 18d on FIGS. 17 and 18. Such grooved timing belts and pulleys are commercially available and have complementary teeth 68 and 69 respectively, formed in their contacting surfaces.

Each pulley 18d preferably has annular rings 70 and 71 secured at the opposite sides of its peripheral surface, for example, by being shrink-fitted onto shoulders 72 formed on the pulley 18d, to act as side flanges which laterally retain the belt 17d on the pulley 18d.

With the arrangement shown in FIGS. 17 and 18, the gripping elements 22d provided on each belt 17d are secured to the latter by C-shaped clamps 23d, corresponding to the clamps 23 previously described with reference to FIGS. 8 and 9. In order to accommodate the C-shaped clamps 23d securing the gripping elements 22d to the belt 17d, each pulley 18d has one or more of the teeth 69 removed therefrom, as at 73 (FIG. 17).

The grooved timing belt 17d which is a commercially available item is usually formed of molded rubber surrounding reinforcing wires 74 to provide the necessary tensile strength for the belt, and the attachment of the gripping elements to the belt by means of the C-shaped clamps 23d is achieved by merely inserting a grooved section (located between adjacent teeth 68) of belt 17d into clamps 23d, and in this way precluding movement of clamp 23d and gripping element 22d longitudinally along belt 17d. This construction eliminates the necessity of forming narrow rectangular cutouts in the opposite side edges of belt 17, as at 25 in FIG. 9, thereby avoiding any appreciable reduction in belt strength.

Since the woven textile or fabric belts and the molded rubber belts which are commercially available in stock sizes and lengths are preferably used in the embodiments of the present invention illustrated in FIGS. 1 to 9, inclusive, and in FIGS. 17 and 18, and since these belt materials cannot be satisfactorily spliced, it is desirable in these embodiments to space the shafts 20 and 21 apart by distances corresponding to the stock sizes of the conveyor belts to be used.

In some applications of the invention, particularly where single sheets of relatively thin material are being transported, the construction of the gripping elements 22 may be simplified without loss of their functions. In the form of the invention shown in FIGS. 10 through 16, for example, the spacers 57, 57b and 57c may be eliminated and the gripping elements 22a, 22b and 22c riveted directly to the respective belts 17a, 17b and 17c. In the forms of the invention shown in FIGS. 3 to 9 and FIGS. 17 and 18, the gripping elements 22 or 22d and the C-shaped clamps 23 or 23d may be fabricated from one flat piece of material and then bent around the belt 17 or 17d into the appropriate shape and position. This simplified construction eliminates all need for rivet connections.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:
1. A sheet conveying device comprising
an elongated flexible carrier means driving said carrier continuously along a path that includes a portion of relatively large curvature followed in the direction of movement of said carrier by a portion of relatively small curvature
at least one gripping element fixedly attached to a part of said carrier and having a free end portion which extends from said part longitudinally of said carrier
said free end portion bearing against said carrier during movement of said element along said relatively small curvature portion and being disposed at an angle to said carrier during movement along said relatively large curvature portion to define an angular pocket between said free end portion and said carrier
and means driven in synchronism with said carrier and continuously at a speed greater than that of said carrier for gripping a sheet and propelling the sheet at such speed edgewise into said pocket to the end of said pocket as said element moves along said relatively large curvature portion and for holding the sheet in abutment with said end until said free end portion has closed against the sheet by movement into said relatively small curvature portion.

2. A sheet conveying device comprising
first and second pulleys rotatable about parallel spaced apart axes
a flexible belt trained around said first and second pulleys
means driving said belt continuously
at least one gripping element extending generally longitudinally at the outside surface of said belt
securing means for said gripping element fixedly attaching it to a part of said belt having a substantially smaller longitudinal extent than said element so that said element has an end portion trailing said securing means
said trailing end portion bearing against said belt during movement of said element along the straight runs of the belt between said pulleys and being disposed at an angle to said belt during movement around said pulleys to define an angular pocket between said trailing end portion and said belt
and means driven in synchronism with said belt and continuously at a speed greater than that of said belt for gripping a sheet and propelling the sheet at such speed edgewise into said pocket to the end of said pocket as said element moves around said first pulley and for holding the sheet in abutment with said end until said trailing end portion has closed against the sheet by movement into a straight run of the belt extending from said first to said second pulley.

3. A sheet conveying device comprising
an elongated flexible carrier having gear teeth spaced along one side thereof
a pulley about which said carrier is trained and having gear teeth spaced about its periphery meshing with the teeth on said carrier
at least one elongated gripping element extending longitudinally of said carrier on the other side thereof
clamping means secured to said element and engaging said one side of said carrier between adjacent gear teeth thereof to fixedly attach said element to said other side of said carrier
said element having a free end portion extending longitudinally of said carrier from said clamping means so as to assume a position at an angle to said carrier and define an angular sheet receiving pocket therebetween during movement of the carrier around said pulley.

4. A sheet conveying device as in claim 2; wherein said securing means includes a clamping member fixed to said gripping element and having end portions thereof embracing opposite marginal portions of said belt, said belt having recesses in the opposite longitudinal edges thereof receiving said end portions to securely locate said gripping element on the belt.

5. A sheet conveying device as in claim 4; wherein said first and second pulleys have peripheral grooves receiving said belts and said grooves have recesses in the bottoms thereof receiving said clamps to ensure the smooth running of the belts around the pulleys and to maintain a predetermined positional relationship between said belts and pulleys.

6. A sheet conveying device as in claim 2; wherein said axes of the first and second pulleys are spaced apart horizontally and the lower straight run of said belt moves in the direction from said first pulley toward said second pulley; and wherein said sheet gripping and propelling means feed the successive sheets along a substantially horizontal plane at a level slightly above the bottom of said first pulley, so that said trailing end of the gripping element bears against said belt soon after receiving a sheet therebetween.

7. A sheet conveying device as in claim 6; wherein said sheet gripping and propelling means includes contacting counter-rotated feed rolls for advancing sheets successively therebetween and driven at a peripheral speed greater than the speed of movement of said gripping element with said belt, said feed rolls being disposed in relation to said first pulley so that the distance from the line of contact of said feed rolls to the bottom of said first pulley is less than the length of each sheet to be conveyed, whereby said feed rolls continue to engage each sheet and to advance the latter at a relatively high speed until the sheet has been gripped between said trailing end of the gripping elements and said belts.

8. A sheet conveying device as in claim 2; wherein at least one of said pulleys has projections extending radially therefrom, and said belts have recesses spaced apart therealong to receive said projections of said one pulley during travel around said latter, thereby to avoid slipping of said belts relative to said one pulley; and wherein said one pulley is rotatably driven in synchronism with said sheet gripping and propelling means in order to accurately time the movement of said gripping element with the operation of said sheet gripping and propelling means.

9. A sheet conveying device as in claim 8; wherein said radial projections are in the form of radial pins projecting from the peripheral surface of said one pulley and being centered between the opposite side edges of said peripheral surface; and wherein said recesses of said belt are defined by spaced apart holes formed in the belt along the longitudinal center line of the latter.

10. A sheet conveying device as in claim 8; wherein said radial projections are arranged along the opposite side edges of the peripheral surface of said one pulley and are circumferentially staggered, and said recesses of the belt are defined by a staggered arrangement of spaced apart cutouts formed in the opposite side edges of the belt.

11. A sheet conveying device as in claim 10; wherein said radial projections are in the form of peripheral teeth on a pair of rotatably driven, axially spaced apart discs; and said one pulley further includes a flanged wheel disposed between said pair of driven discs to define said peripheral surface and being freely rotatable relative to said driven discs.

12. A sheet conveying device as in claim 8; wherein said projections of said one pulley are defined by gear teeth on the latter, and said belt has corresponding gear teeth on its inner surface to define said recesses therebetween.

13. A sheet conveying device comprising
first and second pulleys rotatable about parallel axes spaced apart horizontally
flexible belts running around said first and second pulleys so as to travel along paths having arcuate portions at said pulleys and upper and lower straight runs between said pulleys
means driving said belts for movement in the direction from said first pulleys toward said second pulleys along said lower runs
 each said belt having a plurality of elongated gripping elements extending generally longitudinally at the outside surface of the belt fixed to parts of the belt and spaced therealong
 each element on each of the belts being laterally aligned with an element on each other belt so as to form a plurality of sets of elements spaced longitudinally along the belts
 each of said parts having a substantially smaller longitudinal extent than the gripping element fixed thereto so that each element has an end portion trailing the related belt part
 each gripping element extending substantially tangentially with respect to said part of the related belt so that its trailing end portion is spaced from the adjacent portion of the related belt during movement of the gripping element with the related belt along said arcuate portions of the path of travel and is disposed relatively close to said adjacent portion of the belt during movement along said straight runs
means defining a sheet path extending toward said first pulleys to a location adjacent the bottoms of the latter
and feeding rolls adapted to frictionally engage successive sheets passed therebetween
 said rolls being rotated at a peripheral speed greater than the speed of movement of said belts and being operative to advance successive sheets along said sheet path at such greater speed and insert the leading edge of each sheet between the trailing end portions of one of said sets and the related belts as that set moves along the arcuate portion of its path of travel defined by said first pulleys
 the distance between said feeding rolls and the commencement of said lower runs at said first pulleys being substantially less than the length of each sheet to be conveyed so that each sheet continues to be advanced at such greater speed by said feeding rolls until the leading edge of the sheet has been gripped between the trailing end portions of one of said sets and the adjacent belt portions.

14. A sheet conveying device as in claim 13; wherein each said gripping element is fixed to the related belt by a clamping member fixed to said gripping element and embracing said related belt, said related belt having recesses in the opposite longitudinal edges thereof receiving said clamping member to securely locate each gripping element along the related belt.

15. An article conveying device comprising a flexible carrier driven along a path that includes at least one portion of relatively small curvature and portions of relatively large curvature respectively preceding and following said portion of small curvature, at least one elongated gripping element extending generally in the direction of movement of said carrier, securing means for said element spaced from an end of the latter and fixedly attaching said element to a part of said carrier of more limited extent in said direction of movement than said element, said gripping element being shaped to substantially space said end thereof from the adjacent portion of said carrier during movement of said element with the carrier along said relatively large curvature portions of the path preceding and following said small curvature portion thereby to permit the insertion and removal, respectively, of an article between said end of the element and said adjacent portion of the carrier, and to dispose said end of the element relatively close to said adjacent portion of the carrier for gripping an article therebetween during movement of said element with said carrier along said relatively small curvature portion of the path, and article removing means travelling along the relatively large curvature portion of said path following said relatively small curvature portion at a speed differing from that of said flexible carrier so that said article removing means moves relative to said gripping element in the direction toward said end of the latter and acts on the article to displace the latter from between said end of the element and said adjacent portion of the carrier.

16. A sheet conveying device comprising first and second pulleys rotatable about parallel, spaced apart axes, flexible belts running around said first and second pulleys, elongated gripping elements extending generally longitudinally at the outside surfaces of said belts, securing means for each gripping element spaced from at least the trailing end of the latter and fixedly attaching the element to the related belt at a part of the latter having a substantially smaller longitudinal extent than said element, said gripping element being shaped to dispose said trailing end against said related belt during movement of the gripping element along the straight runs of the belt between said first and second pulleys, and to space said trailing end from said related belt during travel of said element around said pulleys, sheet feeding means operative to feed successive sheets against said belts at said first pulleys to there enter between said trailing ends of the gripping elements and the related belts, whereby each of the successive sheets is gripped between said trailing ends of said elements and said belts during movement of the gripping elements along said straight runs of the belts extending from said first pulleys to said second pulleys, and is released during movement of said gripping elements around said second pulleys, and speed reducing means movable about the axis of said second pulleys at a rotational speed slower than that of the second pulleys and engageable with the leading edge of each sheet as the latter is released from between said trailing ends of the gripping elements and said belts to remove the sheet from the conveying device.

17. A sheet conveying apparatus comprising
an elongated flexible carrier mounted for movement in a path which includes a portion of relatively large curvature followed in the direction of movement of said carrier by a portion of relatively small curvature
at least one gripping element fixedly attached to a part of said carrier and having a free end portion extending longitudinally of said carrier from said part
 said free end portion bearing against said carrier during movement of said element along said small curvature portion and being spaced substantially from said carrier during movement along said large curvature portion and sheet feeding means operative during movement of said element with said carrier along said large curvature portion to move a sheet edgewise into the space then present between said free end portion and said carrier at a linear speed faster than that of said element in a direction of the movement of the sheet and to continue such faster movement of part of the sheet until said element enters said small curvature path portion, so that the leading edge portion of the sheet will be maintained in register with said element and will be gripped between said element and said carrier upon movement of said element into said small curvature portion.

18. A sheet conveying apparatus comprising an elongated flexible carrier means for moving said carrier continuously through a path which includes a portion of relatively small curvature preceded and followed in the direction of movement of said carrier, respectively, by first and second portions of relatively large curvature at least one gripping element fixed to a part of said carrier and having a free end portion extending longitudinally of said carrier from said part said free end portion bearing against said carrier during movement of said element along said small curvature portion and being spaced substantially from said carrier during movement along said large curvature portions sheet feeding means operative to advance a sheet edgewise into the space between said free end portion and said carrier during movement of the element along said first portion so that a leading edge portion of the sheet will be gripped between said element and said carrier as said element enters said small curvature portion and means moved along said second portion and acting upon said sheet as said element is carried along said second portion for displacing said sheet relative to the carrier.

19. Apparatus as claimed in claim 18, said displacing means including an abutment member mounted for movement along said second portion in the direction and in the path of movement of said edge portion therealong and means for moving said member therealong in timed relation to but at a speed lower than that of the movement of said element therealong such that said member will engage said edge portion and retard the sheet upon the releasing of said edge portion.

20. Apparatus as claimed in claim 19, said carrier being an endless conveyor having a plurality of said gripping elements fixed thereto at spaced points therealong said displacing means including for coaction with each of said elements an abutment member as aforesaid moved as aforesaid along said second portion.

21. A sheet conveying apparatus comprising an elongated flexible carrier mounted for movement along a path which includes a portion of relatively small curvature followed in the direction of movement of said carrier by a portion of relatively large curvature at least one gripping element fixedly attached to a part of said carrier and having a free end portion extending longitudinally of said carrier from said part said free end portion bearing against said carrier during movement of said element along said small curvature path portion so that a sheet disposed between said free end portion and said carrier will be gripped therebetween during such movement and being spaced substantially from said carrier during movement along said large curvature path portion and means for displacing said sheet relative to the carrier as said element moves along said large curvature portion including an abutment member mounted for movement along said large curvature portion in the direction and in the path of movement of said sheet therealong and means for moving said member therealong in timed relation to but at a speed lower than that of the movement of said element therealong such that said member will engage said sheet and retard it upon its release by said free end portion.

22. A sheet conveying apparatus comprising a rotatable pulley an elongated carrier member trained over and movable with said pulley so as to move to and about said pulley at least one gripping element secured to said carrier and having a closed position in which it grips a sheet to be conveyed and an open position in which its grip on said sheet is released said element being in its closed position during its movement to said pulley and being in its open position during its movement about said pulley sheet displacing means rotatable about the axis of said pulley and including at least one abutment member to extend radially into the path of the leading edge of a sheet carried by said element about said pulley and means for rotating said displacing means in timed relation to but at an angular speed lower than that of the rotation of said pulley such that said abutment member will engage said leading edge and retard said sheet as said element is moved about said pulley.

23. Apparatus as claimed in claim 22, said displacing means being secured to and rotatable with a shaft on which said pulley is freely rotatable and by which said displacing means are rotated and a first pulley over which said carrier is trained and from which it moves to said rotatable pulley said first pulley being mounted on a rotatable shaft and means for rotating said shafts in unison said pulleys and said means for rotating said shafts having drive ratios whereby said rotatable pulley is rotated at an angular velocity greater than that of said displacing means.

24. A device as in claim 8, said one pulley comprising belt centering means presenting oppositely facing peripheral annular surfaces each sloped at an angle to the axis of the pulley and said belt having therealong laterally facing surfaces respectively mating with said sloped surfaces to keep said belt centered relative to said pulley.

25. A sheet conveying apparatus comprising first and second pulleys rotatable about parallel axes spaced apart horizontally flexible belts running around said first and second pulleys so as to travel along paths having arcuate portions at said pulleys and upper and lower straight runs between said pulleys means driving said belts for movement in the direction from said first pulleys toward said second pulleys along said lower runs each said belt having a plurality of elongated gripping elements extending generally longitudinally at the outside surface of the belt and fixed to parts of the belt spaced therealong each element on each of the belts being laterally aligned with an element on each other belt so as to form a plurality of element sets spaced along the belts each said belt part having a substantially smaller longitudinal extent than the gripping element fixed thereto so that each element has an end portion trailing the related belt part each gripping element extending substantially tangentially with respect to the related belt part so that its trailing end portion is spaced from the adjacent portion of the related belt during movement of the element with the related belt along said arcuate portions of the path of travel and is disposed relatively close to said adjacent portion of the belt during movement along said straight runs means defining a sheet path extending toward said first pulleys to a location adjacent the bottoms of the latter sheet feeding means operative to advance successive sheets to be conveyed along said sheet path toward said first pulleys, each at a linear speed greater than the peripheral speed of said first pulleys, so as to insert the leading edge of each sheet between the trailing end portions of one of said element sets and the related adjacent belt portions as that set moves along the arcuate portion of its path of travel defined by said first pulleys, whereby the trailing end portions of that set grip the leading edge of the sheet against the related adjacent belt portions for transporting the sheet along said lower runs abutment members rotatable about the axis of said second pulleys, each to extend radially into the path of the leading edge of a sheet carried by one of said element sets about said second pulleys and means for rotating said abutment members about said axis in a timed relation to and at an angular speed lower than that of the rotation of said second pulleys such that the leading edge of each of said sheets will be engaged and retarded by one of said abutment members as that edge is released by the related element set upon movement of that set in the arcuate portion of its path of travel defined by said second pulleys.

References Cited in the file of this patent

UNITED STATES PATENTS

| | | |
|---|---|---|
| 1,920,715 | Sager | Aug. 1, 1933 |
| 2,025,371 | Beidler | Dec. 24, 1935 |
| 2,046,189 | Schultz | June 30, 1936 |
| 2,406,205 | Davidson et al. | Aug. 20, 1946 |
| 2,444,170 | Sabel et al. | June 29, 1948 |
| 2,756,995 | Koch | July 31, 1956 |